May 24, 1949.  F. E. NIEDERHISER  2,470,897
HINGED SUPPORTED MOTOR-WRENCH
Filed April 5, 1946
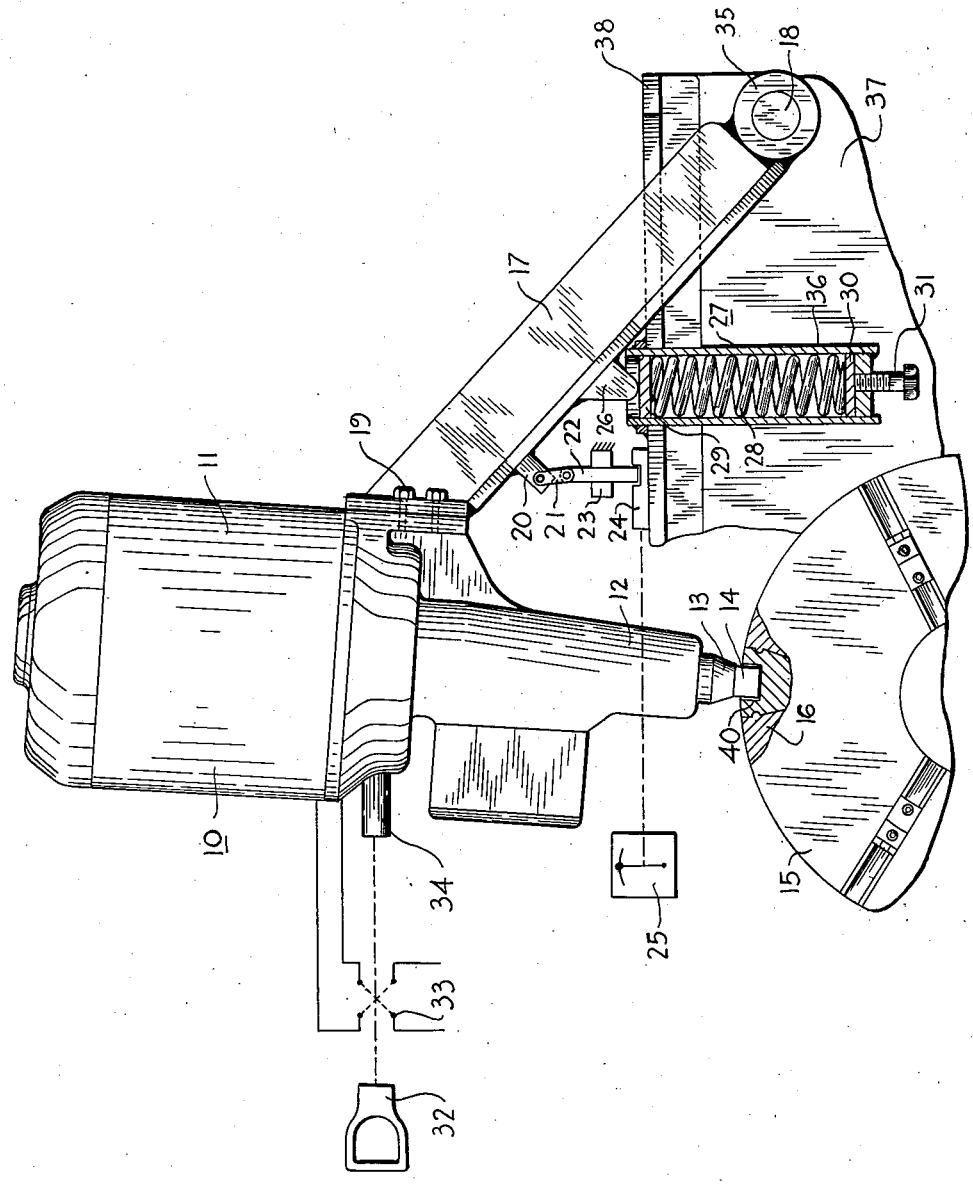
INVENTOR.
Floyd E. Niederhiser
BY
Shoodling and Kroot
attys Patented May 24, 1949

2,470,897

UNITED STATES PATENT OFFICE 2,470,897

HINGED SUPPORTED MOTOR WRENCH

Floyd E. Niederhiser, Cleveland, Ohio

Application April 5, 1946, Serial No. 659,928

5 Claims. (Cl. 279—1)

This invention relates to a power operated mechanism for closing and opening work holding jaws which are adapted to grip or hold work pieces while work is done on the work pieces.

The present invention has utility for operating work gripping jaws on lathe chucks, threaded millers, vises, and milling machines generally regardless of their size, because of its simplicity of operation, but it has additional advantage in connection with large machines adapted for gripping large and heavy work pieces, for in these large machines it has been found that considerable time is required and great difficulty encountered for a single workman to close the jaws onto the work piece with the necessary gripping action, and to open the work jaws from the work piece, with the operator using a wrench of suitable leverage.

Accordingly, an object of the present invention is to provide a power means to open and close the jaws of a work holding device quickly, conveniently and safely.

Another object of my invention is to provide an extremely simplified mounting for a power driven device to operate the jaws of a work holding device.

A further object of my invention is to provide a mechanism for operating the jaws of a work holding device, which mechanism can be provided as an attachment to machine tools, or which may be built into machine tools as an integral part thereof.

A still further object of this invention is to provide a safety feature in connection with a mechanism to operate the jaws of a work holding device, by which it is rendered impossible for the operator to start the mechanism when the mechanism is in driving contact with the work holding device, and also to prevent the application of the mechanism to the work holding device while the work holding device is in motion.

A still further object of this invention is to provide a power wrench to operate the work holding jaws of a rotary lathe chuck, the power wrench mechanism being of a unitary non-extensible construction and being bodily movable in an arcuate path about a center of rotation in such a manner that the lathe chuck may remain stationary when the power wrench is brought into and out of engagement therewith.

Other objects and a fuller understanding of my invention may be had by referring to the following description and claims, taken in conjunction with the accompanying drawing, in which:

The single figure of the drawing illustrates the preferred embodiment of my invention as applied to a rotary lathe chuck, and illustrates a fragmentary portion of a lathe on which the device is mounted.

With reference to the drawing, I illustrate the preferred embodiment of my invention as used in connection with a rotatable lathe chuck 15. The section of a lathe chuck 15 and a portion of a lathe 37 are illustrated for the purpose of illustrating the mode of operation of this preferred embodiment, and not with the intention of limiting the use of my improved power wrench to any one type of machine.

In the illustration, the reference character 10 illustrates generally my power wrench which includes a motor 11, a shaft housing 12, and a shaft 13 extending from the motor 11 through the housing 12. The shaft 13 is formed into a square engaging member 14 at the work engaging end thereof. In the illustration, I have shown a conventional pinion driving member 16 ordinarily used to operate the work engaging jaws of the lathe chuck 15. The pinion driving member 16 has a square socket 40 into which the engaging end 14 may be inserted. Of course, if any other type of jaw actuating device is employed, the shaft 13 may be equipped to engage therewith.

My improved power wrench is a unitary structure of the motor 11 and the shaft 13. These parts are not extensible in relation to one another. Therefore, the entire unit is moved in relation to the member 16 in order to engage and disengage the shaft end 14 and the member 16. Therefore, I have provided means to pivotally mount the power wrench 10 in order to provide the relative movement. This mounting comprises a bracket 17 of cast or fabricated construction which may be secured to the motor at one end thereof by means of suitable bolts 19, and may be pivotally mounted at the other end thereof by the provision of a collar 35 adapted to pivot about a pivot pin 18. The pivot pin 18 may be secured to the lathe 37 in any suitable manner.

Because the power wrench 10 is pivotally mounted, the tendency will be for gravitational pull to force the engaging end 14 towards the member 16 at all times. Therefore, I have provided a counterbalance 27 to offset this tendency. This counterbalance 27 comprises a housing 36 enclosing a spring 28. A bumper 26 is provided on the under side of the bracket 17. A rider plate 29 is positioned between the spring 28 and the bumper 26 to provide a smooth surface against which the bumper 26 may contact. A second rider plate 30 is provided at the lower end of the spring. An adjustment screw 31 is provided to extend through the botto mof the housing 36 and push against the rider plate 30. Thus, the spring may be compressed to any desired degree in order to offset the gravitational pull tending to move the power wrench 10 into engagement with the chuck 15. The counterbalance 27 may be secured to the lathe 37 in any suitable manner, and is illustrated as being welded in place. Of course, any other convenient type of counterbalancing device may be employed with equal results.

In order to operate my improved power wrench

10, I have provided for a control handle 32 to operate a reversing switch 33, and also to attach mechanically to a control arm 34. This structure is illustrated diagrammatically in the drawing, because any suitable type of control handle may be employed, and may be positioned in any suitable manner to make the control handle 32 accessible to the operator. In operation, the control handle 32 may be rotated to the right or to the left to operate the reversing switch 33 and cause the motor 11 to rotate in a clockwise or counter-clockwise direction as desired, or it may be moved to shut off the power and stop the rotation of the motor 11. Also, the handle 32 may be pushed upwardly or pulled downwardly to move the entire power wrench about the pivot point 18 to bring the engaging end 14 into or out of engagement with the socket 40 of the cam driving element 16.

It is of course understood, that the power means used to rotate the chuck 15 must be turned off while the power wrench is in engagement with the chuck 15, and also, the wrench 10 must not be brought toward the chuck 15 while the chuck is in motion. In order to provide a safety device which will prevent accidental starting of the chuck 15 while the power wrench is in engagement therewith, and also to prevent the power wrench from being lowered toward the chuck while the chuck is in motion, I have provided a safety lock to operate in conjunction with the lathe power control. This safety device is illustrated diagrammatically to better illustrate the principle of operation. An attachment arm 20 is secured to the lower side of the bracket 17. A link 21 is pivotally secured to the attachment arm 20 at one end thereof and is adapted to operate a pin 22 pivotally connected to the opposite end thereof. A collar 23 is secured to the lathe 37 in any suitable manner and is used to guide the pin 22 in a straight endwise motion. A grooved slide member 24 is adapted to be engaged by the pin 22. This grooved slide 24 is mechanically connected to the lathe control arm of a control box 25 as illustrated by the dot-dash line extending therebetween. Any suitable method of mechanical attachment therebetween in order to cause the lathe control arm and the grooved slide 24 to operate as a unit may be employed. Thus, when the control arm of the box 25 is in the "off" position, the groove of the slide 24 is in position to receive the end of the pin 22. Therefore, the power wrench may pivot about the point 18 and move downwardly to engage the end 14 with the socket 40. However, if the control arm or the box 25 is in any position other than neutral, the groove will be shifted to a position which will not admit the pin, and the power wrench 10 cannot be moved downwardly to engage therewith. Likewise, once the pin 22 is in engagement with the groove of the slide 24, and the end 14 in engagement with the socket 40, the control arm of the box 25 cannot be moved accidentally to cause the chuck 15 to rotate. Thus, my improved power wrench may be used with complete safety and without fear of mechanical damage due to accidental engagement of the power wrench with the moving chuck, or an accidental applying of power to the chuck 15 while the wrench is in engagement therewith.

There are many times when it is desirable to have the power wrench 10 moved out of the way for the purpose of repairing the machine with which it is cooperating, or for other purposes. Therefore, my improved device is able to swing about the pivot pin 18 to remove the power wrench to an out of the way position. In order to facilitate this movement, I have provided a stop 38 on the lathe 37 which may be employed to contact a portion of the bracket 17. Thus, the wrench 10 may be swung about the pivot 18 until the bracket 17 engages the stop 38. Thereafter, the wrench will rest in place upon the stop 38 and be conveniently out of the way until again required. The lathe 37 may be used in the conventional ordinary manner during the time the wrench 10 is thus moved out of the way, and may be serviced without the operator being hampered by additional machinery in his way.

Although it is possible to use my improved wrench with the pivot pin 18 placed in any convenient position to bring the end 14 into engagement with the socket 40, by far the best and most desirable results are obtained if the pivot pin 18 is located to cause the minimum amount of arcuate movement of the shaft 13 as the end 14 thereof engages with the socket 40. Thus, I have found it highly desirable to locate the pivot pin 18 on a plane that is perpendicular to the axis of rotation of the shaft 13 and tangent to the surface of the chuck 15 at the engaging surface. That is, the plane should extend to the region of contact between the end 14 and the socket 40. In applications not employing a rotatable member, the plane may be defined as passing through any portion of the region of contact and may preferably pass along the upper surface of the driven member. However, the axis of rotation of the shaft 13 and the plane extending to the center of the pivot pin 18 should always be maintained in substantially perpendicular relationship.

Also, it is desirable to provide a bracket arm 17 of as long a length as practical for use with the particular machine with which the wrench is cooperating. The longer the bracket 17 that is provided, of course, the smaller will be the arcuate path of the engaging end 14.

By the provision of the pivot pin 18 being located as described, and by the provision of the relatively long bracket arm 17, I have found that the amount of arcuate movement of the end 14 in relation to the socket 40, is reduced to a minimum. Therefore, I have provided for a clearance of fit between the end 14 and the socket 40 to allow the small amount of movement. The clearance provided between the end 14 and the socket 40 will therefore permit the end 14 to enter into the socket 40 without rotating the chuck 15. Thus, my improved power wrench may be employed even with machines in which the chuck 15 is securely locked in position when the driving motor is turned off. Also, my improved power wrench may be employed with actuating members which are permanently located and cannot be moved. It is my discovery of the location of the pivot pin 18 in relation to the axis of rotation of the shaft 13 that makes my improved power wrench operative and entirely satisfactory.

As shown in the illustration, I have positioned the power wrench in a tilted position about five degrees to the right of the perpendicular. However, the illustrated five degrees is not critical, and in some instances I have placed the power wrench at an angle as high as fifteen degrees or more. Accordingly, the pivot pin 18 is dropped below the horizontal five degrees in order to keep the angular relationship of the tangential plane and the axis of rotation at ninety degrees. The power wrench 10 could be moved to any convenient position either to the right or to the left of the perpendicular and will be found to operate entirely satisfactory so long as the position of the pivot pin 18 is adjusted accordingly. By the same token, the pivot pin 18 may be located in any convenient position upon the machine with which it is to cooperate, and the power wrench 10 may be positioned to maintain the angular relationship described.

My improved mechanism has been found to require considerably less maintenance and installation cost than other power wrenches known to the art today, because of the extreme simplicity of construction and operation. The entire device is self contained and of a construction having practically no complicated parts to require constant attention and maintenance.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Power means for operating the actuating member of a rotatable chuck of a machine tool, said power means comprising, a motor having a shaft adapted to engage said actuating member upon relative movement therebetween, said work holding chuck being rotatable about a first axis of rotation, said power means being mounted on a bracket pivotal about a second axis of rotation for arcuate swinging movement, said first and second axes of rotation being separated a distance apart and extending parallel to one another, said actuating member and said motor and shaft being rotatable about a third axis, said third axis being perpendicular to a tangential plane extending from said second axis of rotation through the area of engagement between the actuating member and the shaft.

2. In a work holding device having work engaging jaws and a jaw actuating element for operating the work engaging jaws to engage and disengage a work piece, the provision of a power means to actuate said jaw actuating element, said power means comprising a driving means, a shaft member driven by said means, said shaft member having engaging surfaces to slidably engage with and disengage from driving relationship with said jaw actuating element upon relative movement between said shaft member and said jaw actuating element, pivotal mounting means to provide relative movement of the driving means and shaft relative to said jaw actuating element, said pivotal mounting means comprising a bracket arm fixedly secured to the power means at one end thereof and pivotally mounted at the other end thereof, said pivotal mounting serving to pivot the said power means in an arcuate path about the axis of the pivot, said axis of the pivot lying on a plane passing through the area of contact between the shaft engaging surfaces and the jaw actuating element, said plane being substantially perpendicular to the axis of rotation of said shaft member.

3. A power wrench for operating the jaw actuating element of a lathe chuck comprising, a driving motor, a shaft driven by said motor, said shaft member having engaging surfaces to slidably engage with and disengage from driving relationship with said jaw actuating element by axial movement of said shaft relative to said jaw actuating element, a bracket arm having a support end and a pivot end, said motor and shaft being fixedly supported on said support end, said pivot end being pivotally mounted on a base in position to swing said shaft into and out of engagement with said jaw actuating element, counter balance means to yieldingly resist pivotal swinging movement of the bracket arm to move said shaft into engagement with the jaw actuating element, and safety lock means adapted to lock said bracket against swinging movement of the bracket arm to move said shaft into engagement with the jaw actuating element when the lathe is in operation.

4. In a work holding device having work engaging jaws and a jaw actuating element for operating the work engaging jaws to engage and disengage a work piece, the provision of a power means to actuate said jaw actuating element, said power means comprising a driving motor, a shaft member driven by said motor, said shaft member having engaging surfaces to slidably engage with and disengage from driving relationship with said jaw actuating element upon relative movement between said shaft member and said jaw actuating element, and pivotal mounting means including a bracket arm having a support end and a pivot end, means fixedly mounting said motor and shaft on the said support end of the bracket, said pivot being adapted to be pivotally mounted on a base a distance from said jaw actuating element, said bracket being pivotal on said base to swing said motor and shaft through an arcuate path during periods of use with the work holding device and to an out-of-the-way position during periods when not in use.

5. A power wrench for operating the jaw actuating elements of a work holding device comprising, a driving motor, a shaft member driven by said motor, said shaft member having engaging surfaces to slidably engage with and disengage from driving relationship with said jaw actuating elements by relative axial movement with respect to said jaw actuating elements, a bracket arm having a support end and a pivot end, said pivot end having a pivot axis, said shaft member being fixedly carried on said support end, said pivot end being adapted to be pivotally mounted on a base a distance from said jaw actuating elements, said shaft member thereby being swingable in an arcuate path about said pivot end as an axis.

FLOYD E. NIEDERHISER.

REFERENCES CITED

The following references are of record in the file of this patent:

UNITED STATES PATENTS

| Number | Name | Date |
|---|---|---|
| 1,449,828 | Marmin et al. | Mar. 27, 1923 |
| 1,695,493 | Holmes | Dec. 18, 1928 |
| 1,763,552 | Cook | June 10, 1930 |
| 1,874,888 | Burrell | Aug. 30, 1932 |
| 2,180,488 | Hamersveld | Nov. 21, 1939 |
| 2,219,851 | Sloan et al. | Oct. 29, 1940 |
| 2,249,240 | Groene et al. | July 15, 1941 |
| 2,358,049 | Bogart | Sept. 12, 1944 |

FOREIGN PATENTS

| Number | Country | Date |
|---|---|---|
| 472,015 | Great Britain | Sept. 15, 1937 |